United States Patent [19]
Sugimoto et al.

[11] Patent Number: 5,844,403
[45] Date of Patent: Dec. 1, 1998

[54] POWER APPARATUS

[75] Inventors: Hidehiko Sugimoto, Fukui; Yasuyuki Morishima, Tsuzuki-gun, both of Japan

[73] Assignee: Murata Manufacturing Co., Ltd., Japan

[21] Appl. No.: 791,374

[22] Filed: Jan. 30, 1997

[30] Foreign Application Priority Data

Jan. 30, 1996 [JP] Japan .................................. 8-013857

[51] Int. Cl.⁶ ............................................... G05F 1/56
[52] U.S. Cl. ................................................... 323/282
[58] Field of Search .............................. 323/222, 282, 323/285; 363/21

[56] References Cited

U.S. PATENT DOCUMENTS 5,267,136  11/1993  Suga et al. ................................ 363/65
5,444,358   8/1995  Delepaut ................................. 323/282
5,583,752  12/1996  Sugimoto et al. ........................ 363/21
5,594,323   1/1997  Herfurth et al. ........................ 323/222

Primary Examiner—Matthew V. Nguyen
Attorney, Agent, or Firm—Ostrolenk, Faber, Gerb & Soffen, LLP

[57] ABSTRACT

A power apparatus includes a compensator which is capable of enabling phase to lead as the frequency increases, even if gain increases, as shown in a Bode diagram, so as to operate stably. The power apparatus includes a power converter for controlling a voltage from a power source and supplying it to a load, a smoothing circuit which is connected between the power converter and the load, and a controller for controlling the power converter, wherein the controller is formed of an amplifier, first to seventh (or eighth) resistors, and first and second capacitors, arranged to provide specific transfer functions.

2 Claims, 7 Drawing Sheets

POWER APPARATUS

BACKGROUND OF THE INVENTION

1. Field of the Invention

The present invention relates to a power apparatus and, more particularly, to a power apparatus which is designed to generate a voltage responsive to a command voltage.

2. Description of the Related Art

A conventional power apparatus must be designed in such a way that an output voltage Vo stably follows a command voltage Vr at a high speed.

FIG. 10 is a circuit diagram of such a power apparatus. As shown in FIG. 10, the power apparatus comprises a controller 1, a power converter 2, a power source 3, a smoothing circuit 4 and a load 5.

The controller 1 controls the power converter 2 and includes an amplifier 11, resistors R1 to R3, and capacitors C1 to C3. A command voltage Vr is applied to the non-inversion input terminal (+) of the amplifier 11, and an output voltage Vo is applied to the inversion input terminal (−) of the amplifier 11 via a parallel circuit formed of the resistor R1 and the capacitor C1. A series circuit formed of the resistor R2 and the capacitor C2 is connected between the inversion input terminal and the output terminal of the amplifier 11, with the capacitor C3 being further connected in parallel to the series circuit. The inversion input terminal of the amplifier 11 is connected to a reference electrical potential, for example, ground potential, via the resistor R3. Further, the output terminal of the amplifier 11 is connected to a comparison input terminal 21a of a comparator 21 inside the power converter 2. A control signal u which takes the form of a function of the difference between the command voltage Vr and the output voltage Vo is output from the controller 1 to the input terminal 21a of the comparator 21 in the power converter 2.

The power converter 2 controls a voltage from the power source 3 and supplies it to the smoothing circuit 4. The control signal u output from the controller 1 is fed to the comparison input terminal 21a of the comparator 21, and a triangular wave signal is fed from a triangular wave generator 22 to a reference input terminal 21b. The comparator 21 compares the control signal u with the triangular wave signal and feeds a pulse signal having a pulse width corresponding to the level of the control signal u to a gate drive circuit 23.

The gate drive circuit 23 supplies a drive pulse to the gate of a power MOS (metal-oxide-semiconductor) field-effect transistor (power MOSFET) 24. The drain of the power MOSFET 24 is connected to the positive polarity side of the power source 3 via a choke coil 25. Further, the source of the power MOSFET 24 is connected to the negative polarity side of the power source 3 and the negative polarity side of the load 5, and is grounded. The power MOSFET 24 is turned on and off in response to the drive pulse supplied to the gate thereof, and outputs a pulse voltage which is stepped up by the choke coil 25 to the smoothing circuit 4.

The smoothing circuit 4 smooths the pulse voltage output from the power converter 2 into a direct current and supplies the DC voltage to the load 5. The smoothing circuit 4 comprises a rectification diode 41 and a capacitor 42. The anode of the rectification diode 41 is connected to the drain of the power MOSFET 24 of the power converter 2, and the capacitor 42 is connected in parallel to the load 5.

The determination of the transmission function between the control signal u and the output voltage Vo on the basis of a state equation of the circuit gives the following:

$$\frac{Vo}{u} = \frac{Vin}{(1-D)^2}\left(1 - \frac{Le}{R}s\right)\frac{\frac{1}{LeC}}{s^2 + \frac{1}{CR}s + \frac{1}{LeC}} \quad (1)$$

$$= \frac{Vin}{(1-D)^2}\left(1 - \frac{Le}{R}s\right)\frac{\omega_n^2}{(s^2 + 2\zeta\omega_n s + \omega_n^2)}$$

where $$Le = \frac{Vin}{(1-D)^2},$$

D is the duty cycle of the power MOSFET 24.

$$\omega_n^2 = \frac{1}{LeC}, \; \zeta = \frac{1}{2R}\sqrt{\frac{Le}{C}}$$

In equation (1) above, when $\zeta<1$, there is a portion of the function where the phase is delayed as the frequency increases even though the gain increases. In order to cancel the portion which is likely to become unstable due to the fact that the phase is delayed even though the gain increases in the manner described above, it is necessary to provide a phase compensation element so as to have a portion where the phase leads even though the gain is decreased. In FIG. 10, this phase compensation element is formed of resistors R1 and R2 and capacitors C1 to C3.

The determination of the relationship between the output voltage Vo of the conventional power apparatus shown in FIG. 10 and the control signal u gives the following:

$$u = \frac{\frac{C1}{C3}\left(s + \frac{1}{C1R1}\right)\left(s + \frac{1}{C2R2}\right)}{s\left\{s + \frac{1}{R2}\left(\frac{1}{C2} + \frac{1}{C3}\right)\right\}} \quad (2)$$

$$\left\{\left\{\frac{\left(1 + \frac{C3}{C1}\right)s^2 + \left(\frac{1}{C1}\left(\frac{1}{R1} + \frac{1}{R2} + \frac{1}{R3}\right) + \frac{1}{C2R2}\left(1 + \frac{C3}{C1}\right)\right)s + \frac{1}{C1C2R2}\left(\frac{1}{R1} + \frac{1}{R3}\right)}{\left(s + \frac{1}{C1R1}\right)\left(s + \frac{1}{C2R2}\right)}\right\}Vr - Vo\right\}$$

The block diagram thereof is shown in FIG. 11. The transmission function of the controller 1 when the control signal u which is input to the comparator 21 is seen from the output voltage Vo is expressed as follows:

$$\frac{\frac{C1}{C3}\left(s+\frac{1}{C1R1}\right)\left(s+\frac{1}{C2R2}\right)}{s\left\{s+\frac{1}{R2}\left(\frac{1}{C2}+\frac{1}{C3}\right)\right\}} = \frac{b0(s+b1)(s+b2)}{s(s+a)} \quad (3)$$

The Bode diagram thereof is shown in FIG. 12.

However, in the controller of the above-described conventional power apparatus, as can be seen in FIG. 12, when the phase is made to lead, the gain increases, and a problem might occur, such as being unable to achieve a stable operation under the above-described condition of ζ<1.

SUMMARY OF THE INVENTION

An advantage of the present invention is to solve the above-described problem and to provide a power apparatus which operates stably even if the gain increases as the frequency increases as represented in a Bode diagram.

To achieve the above-described advantage, according to one aspect of the present invention there is provided a power apparatus, comprising: a power converter for controlling a voltage from the power source and supplying it to a load; a smoothing circuit which is connected between the power converter and the load; and a controller for controlling the power converter, the controller receiving a command voltage and an output voltage as inputs, using $$\frac{b2s^2 + b1s + b0}{s(s+a)}$$

as a computational element with respect to a difference obtained by subtracting the output voltage from a function of the command voltage and supplying an output thereof to the power converter, wherein the controller comprises an amplifier, the connection point of a first and a second resistor which are connected in series between the positive polarity side of the load and the reference electrical potential being connected to one of the input terminals of the amplifier, a series circuit formed of a first capacitor and a third resistor is connected between one of the input terminals of the amplifier and the output terminal of the amplifier, the connection point of a fourth resistor and a parallel circuit formed of a fifth resistor and a second capacitor, which are connected in series between a positive polarity side of said load and the reference electrical potential is connected via a sixth resistor to the other input terminal of the amplifier, and the command voltage is applied via a seventh resistor to the other input terminal of the amplifier. With this apparatus, since a control system having a function of decreasing gain while the phase is made to lead within a particular frequency range can be realized, the controller becomes stable with respect to variations in internal parameters and input/output variations, response can also be improved with respect to dynamic input/output variations, and the output voltage can be made to follow the command voltage at a high speed.

According to another aspect of the present invention there is provided a power apparatus, comprising: a power converter for controlling a voltage from the power source and supplying it to a load; a smoothing circuit which is connected between the power converter and the load; and a controller for controlling the power converter, the controller receiving a command voltage and an output voltage as inputs, using $$\frac{\beta 2s^2 + \beta 1s + \beta 0}{(s+\alpha 0)(s+\alpha 1)}$$

as a computational element with respect to the difference obtained by subtracting the output voltage from a function of the command voltage and supplying an output thereof to the power converter, wherein the controller comprises an amplifier, the connection point of a first and a second resistor which are connected in series between the positive polarity side of the load and the reference electrical potential being connected to one of the input terminals of the amplifier, a series circuit formed of a first capacitor and a third resistor is connected between one of the input terminals of the amplifier and the output terminal of the amplifier, a fourth resistor connected to this series circuit in parallel is also connected between said one of the input terminals and said output terminal, the connection point of a fourth resistor and a parallel circuit formed of a fifth resistor and a second capacitor, which are connected in series between a positive polarity side of said load and the reference electrical potential is connected via a seventh resistor to the other input terminal of the amplifier, and the command voltage is connected via an eighth resistor to the other input terminal of the amplifier. With this apparatus, when the load decreases suddenly, the control signal can be reduced, preventing the output voltage from increasing.

According to the power apparatus of the above-described aspects of the present invention, the transmission function of the controller seen from when the control signal u which is input to the comparator from the output voltage Vo is made to take the form of $$\frac{b2s^2 + b1s + b0}{s(s+a)}$$

or $$\frac{\beta 2s^2 + \beta 1s + \beta 0}{(s+\alpha 0)(s+\alpha 1)}$$

and the root of the numerator is made to be a complex number. Thus, a function, such as the gain, is decreased while the phase is made to lead in a particular frequency range, and a more stable controller having a satisfactory response can be realized.

The above and further advantages aspects and novel features of the invention will become more apparent from the following detailed description when read in connection with the accompanying drawings.

DESCRIPTION OF EMBODIMENTS OF THE INVENTION

Embodiments of the present invention will be described below with reference to the accompanying drawings.

Figure 1:
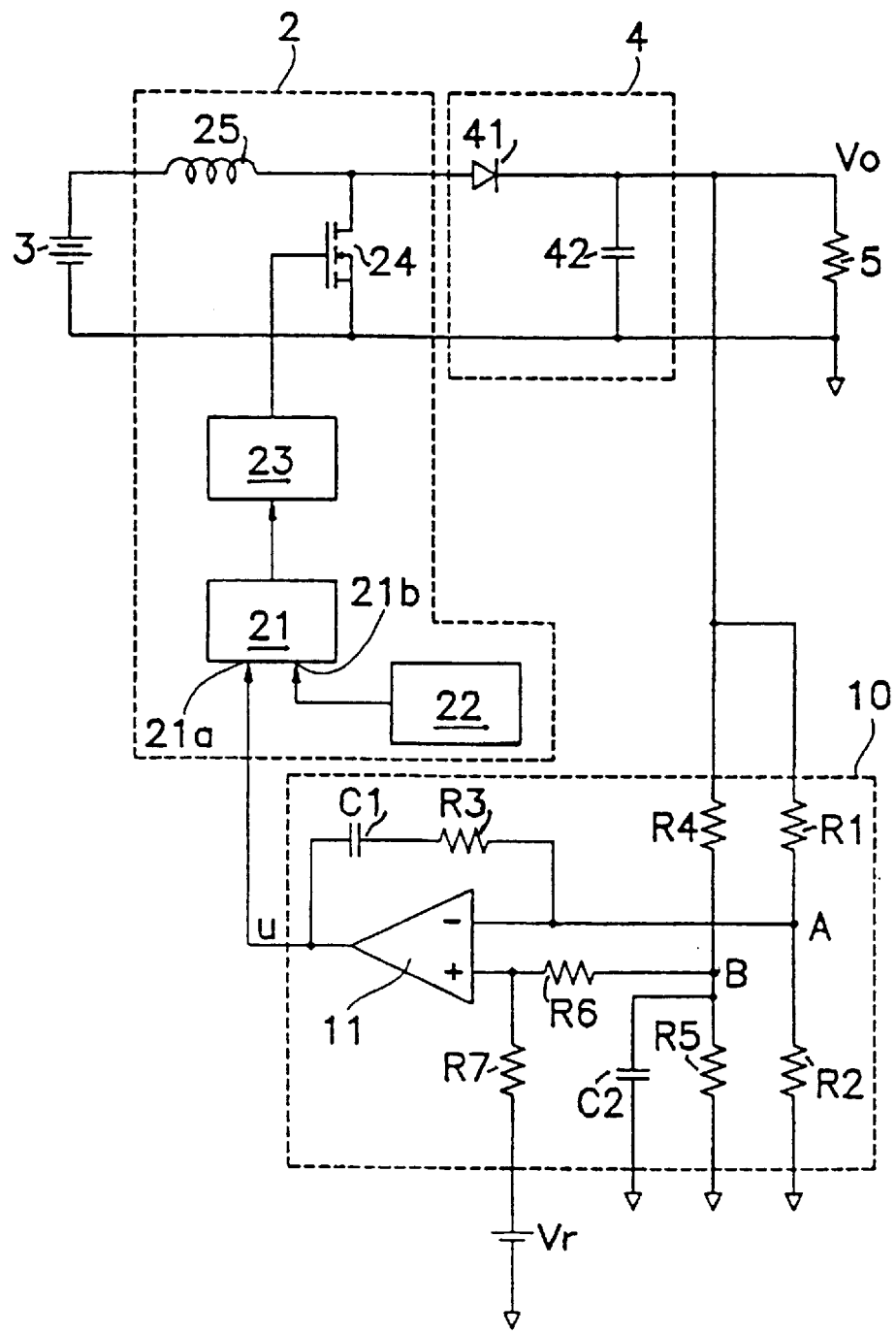
FIG. 1 is a circuit diagram of a first embodiment of a power apparatus of the present invention.

FIG. 1 is a circuit diagram of a first embodiment of a power apparatus of the present invention. The components in FIG. 1 are the same as those of the known art in FIG. 7 except for a controller 10 and therefore, a description thereof is omitted.

Referring to FIG. 1, the controller 10 comprises an amplifier 11, a first resistor R1 to a seventh resistor R7 and a first capacitor C1 and a second capacitor C2. A connection point A of the first resistor R1 and the second resistor R2 which are connected in series between the positive polarity side of a load 5 and a reference electrical potential, e.g., ground potential, is connected to one of the input terminals of an amplifier 11, i.e., the inversion input terminal. An output voltage Vo is applied thereto via the first resistor R1. Further, a series circuit formed of the first capacitor C1 and the third resistor R3 is connected between the inversion input terminal and the output terminal of the amplifier 11.

On the other hand, a connection point B of the fourth resistor R4 and a parallel circuit formed of the fifth resistor R5 and the second capacitor C2, is connected via the sixth resistor R6 to the other input terminal, i.e., the non-inversion input terminal of the amplifier 11, and the command voltage Vr is connected thereto via the seventh resistor R7. The resistors R4 and R5 are connected in series between the positive polarity side of the load 5 and the ground potential, whereby the output voltage Vo is applied to the non-inversion input terminal via the fourth resistor R4 and the sixth resistor R6, and the command voltage Vr is applied to the non-inversion input terminal via the seventh resistor R7.

Further, the output terminal of the amplifier 11 is connected to the comparison input terminal 21a of the comparator 21 inside the power converter 2.

Here, determination of the relationship between the output voltage Vo of the power apparatus of this embodiment shown in FIG. 1 and the control signal u gives the following:

$$u = \frac{b2s^2 + b1s + b0}{s(s+a)} \left\{ \left( k + \frac{s(d1s + d0)}{b2s^2 + b1s + b0} \right) Vr - Vo \right\} \tag{4}$$

where $$a = \frac{1}{C2} \left( \frac{1}{R4} + \frac{1}{R5} + \frac{1}{R6 + R7} \right)$$

$$b0 = \frac{1}{C1C2R1} \left( \frac{1}{R4} + \frac{1}{R5} + \frac{1}{R6 + R7} \right) - \frac{R7}{C1C2R4(R6+R7)} \left( \frac{1}{R1} + \frac{1}{R2} \right)$$

$$b1 = \frac{1}{C1R1} + \frac{R3}{C2R1} \left( \frac{1}{R4} + \frac{1}{R5} + \frac{1}{R6+R7} \right) - \frac{R7}{C2R4(R6+R7)} \left\{ \left( \frac{1}{R1} + \frac{1}{R2} \right) R3 + 1 \right\}$$

$$b2 = \frac{R3}{R1}$$

$$k = \frac{\left( \frac{1}{R1} + \frac{1}{R2} \right) \left\{ \left( \frac{1}{R4} + \frac{1}{R5} \right) \frac{R6}{R6+R7} + \frac{1}{R6+R7} \right\}}{\left( \frac{1}{R4} + \frac{1}{R5} + \frac{1}{R6+R7} \right) \frac{1}{R1} - \left( \frac{1}{R1} + \frac{1}{R2} \right) \frac{R7}{R4(R6+R7)}}$$

$$d0 = \frac{1}{C1} \left( \frac{1}{R1} + \frac{1}{R2} \right) \frac{R6}{R6+R7} + \frac{1}{C2(R6+R7)} \left\{ 1 + \left( \frac{1}{R4} + \frac{1}{R5} \right) R6 \right\} \left\{ 1 + \left( \frac{1}{R1} + \frac{1}{R2} \right) R3 \right\} - b1k$$

$$d1 = \left\{ \left( \frac{1}{R1} + \frac{1}{R2} \right) R3 + 1 \right\} \frac{R6}{R6+R7} - b2k$$

Figure 2:
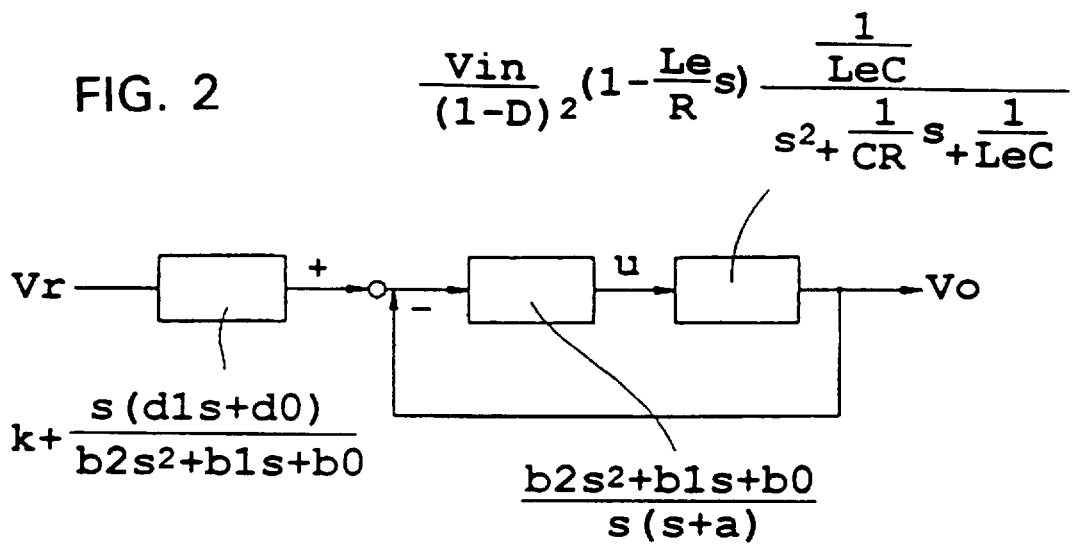
FIG. 2 is a block diagram of the power apparatus shown in FIG. 1.
Figure 3:
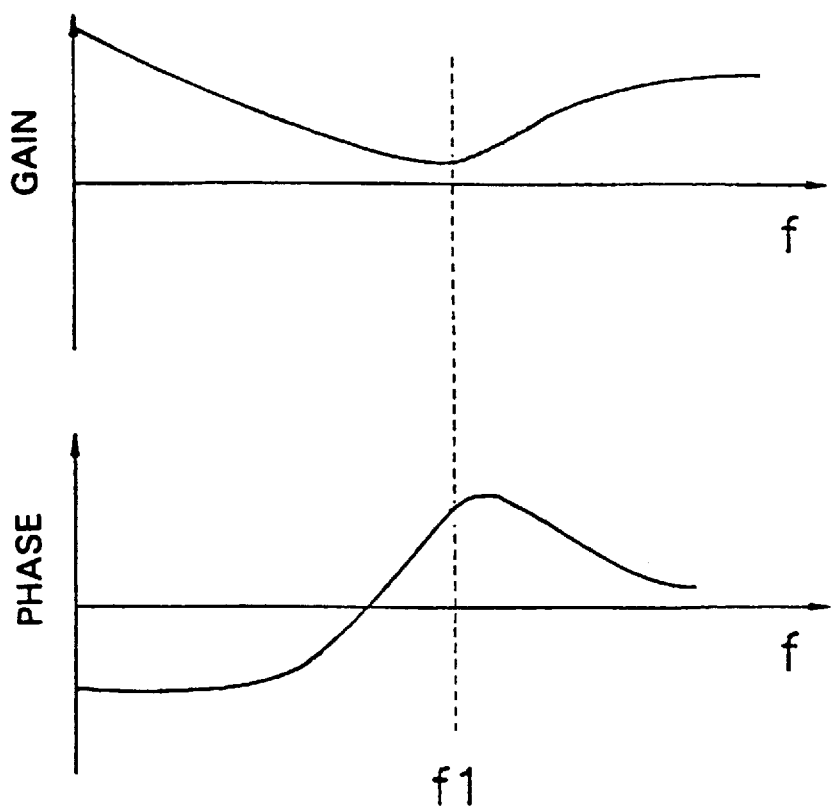
FIG. 3 is a Bode diagram of the power apparatus shown in FIG. 1.

FIG. 2 is a block diagram of the power apparatus shown in FIG. 1. In FIG. 2, the controller 10 uses $$\frac{b2s^2 + b1s + b0}{s(s+a)} \tag{5}$$

as a computational element with respect to the difference obtained by subtracting the output voltage Vo from the function of the command voltage Vr and supplies the output thereof to the power converter 2. FIG. 3 is a Bode diagram of the power apparatus shown in FIG. 1.

In the first embodiment as described above, the controller 10 is arranged as shown in FIG. 1, and the transmission function thereof is made to take the form shown in equation (5) so that the function of decreasing gain while the phase is made to lead at a particular frequency f1 can be realized as shown in FIG. 3. As a result, a design for a more stable control system having a satisfactory response is made possible.

Figure 4:
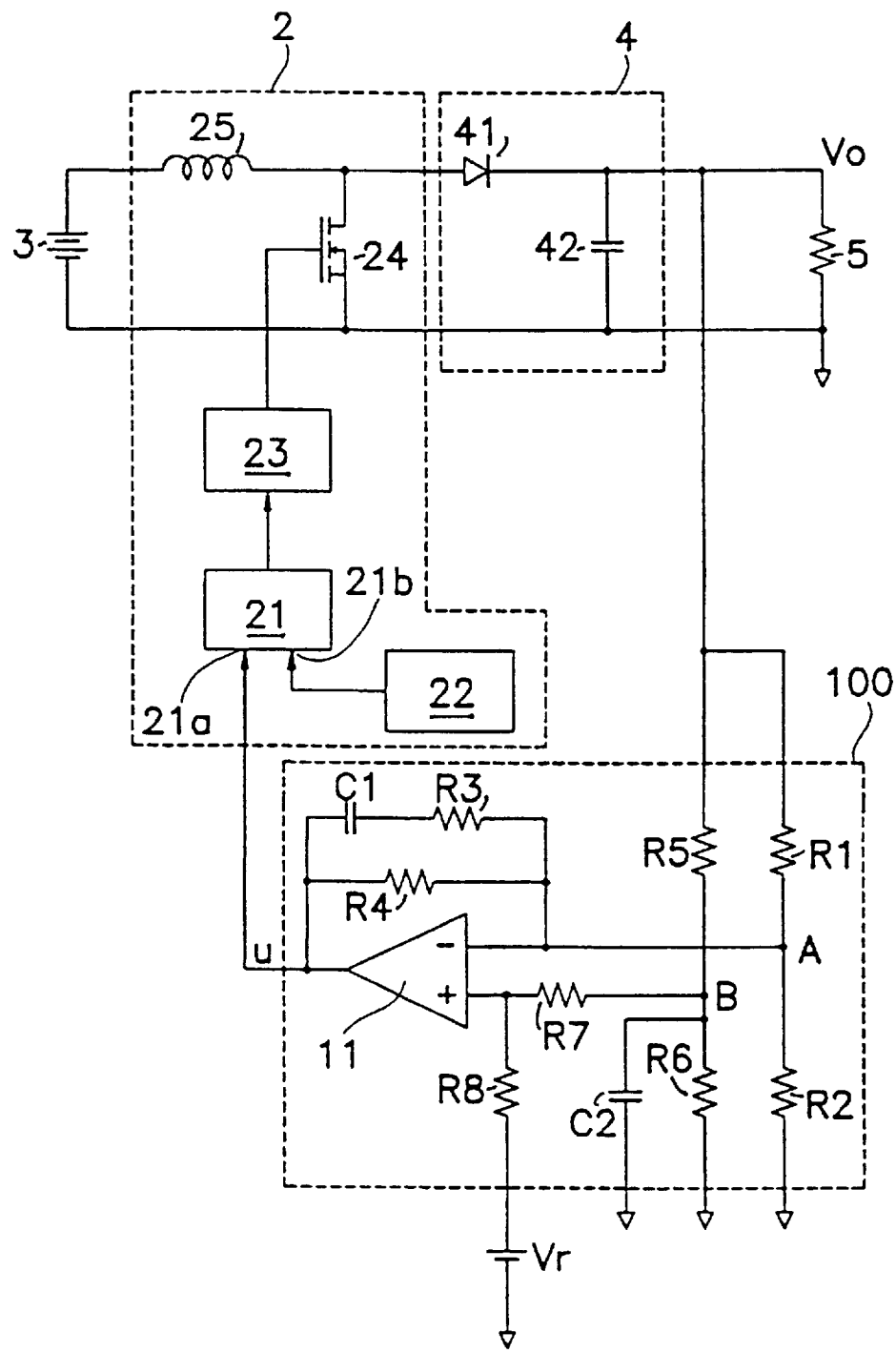
FIG. 4 is a circuit diagram of a second embodiment of a power apparatus of the present invention.
Figure 10:
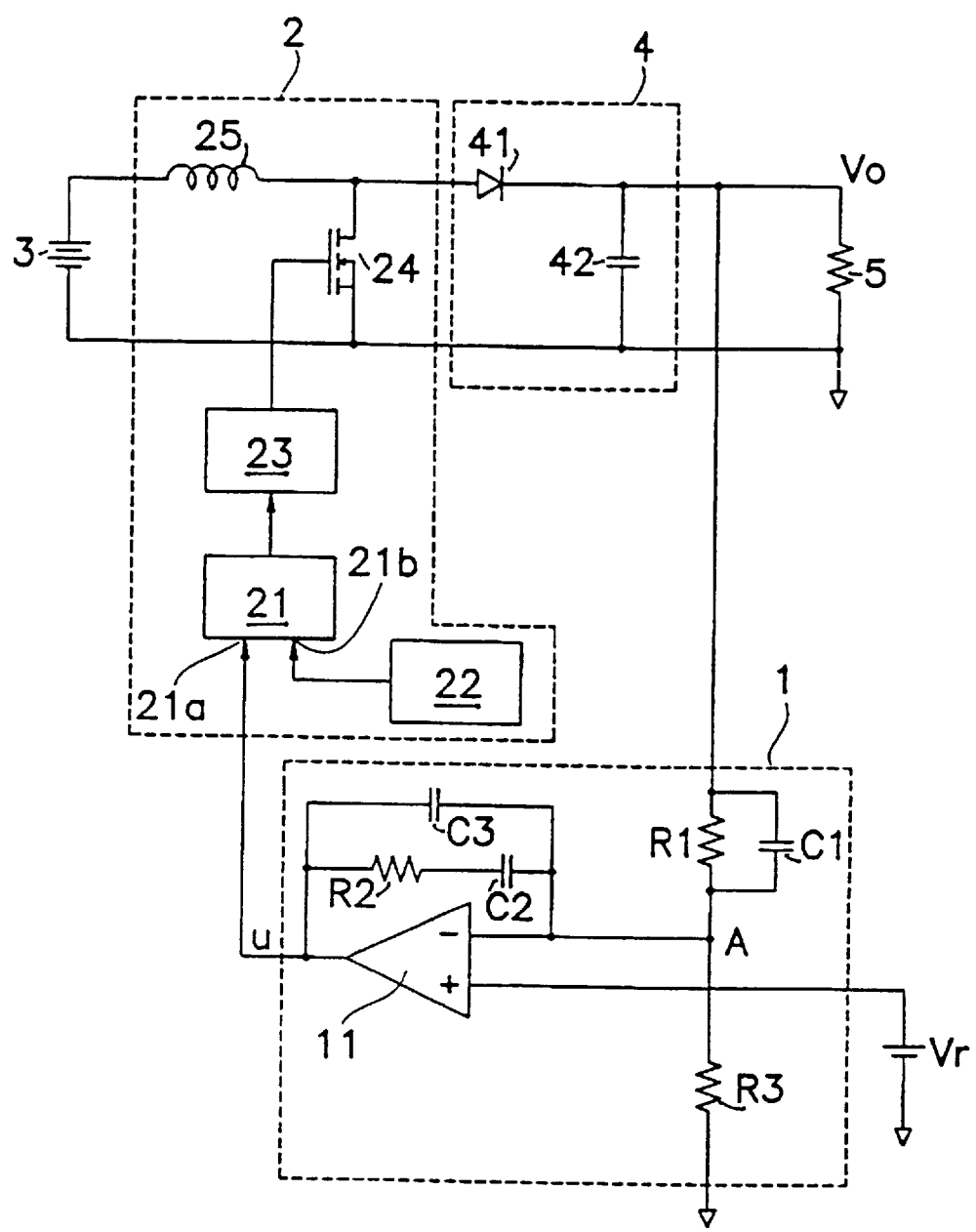
FIG. 10 is a circuit diagram of a conventional power apparatus.
Figure 11:
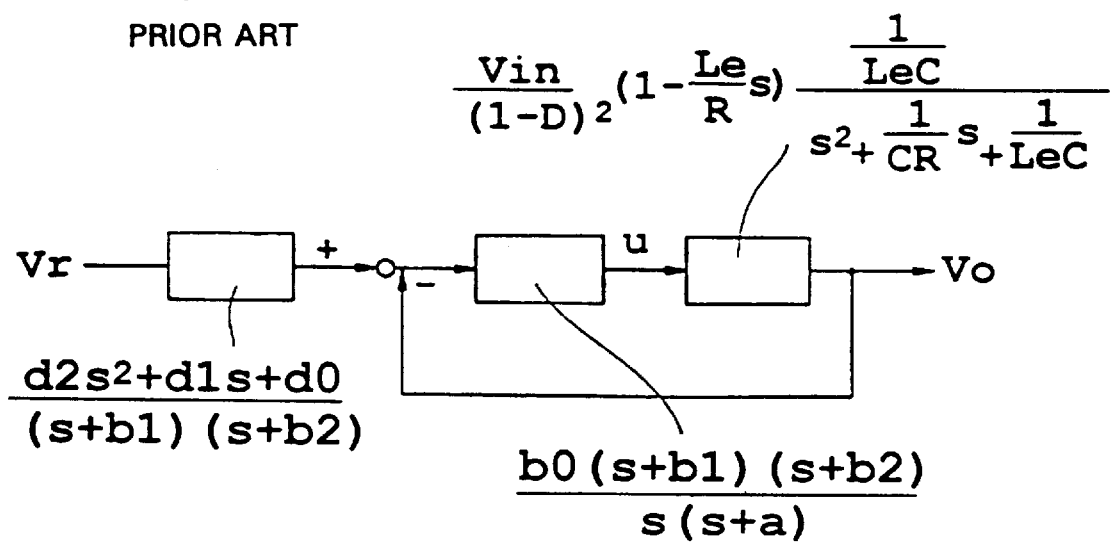
FIG. 11 is a block diagram of the power apparatus shown in FIG. 10.
Figure 12:
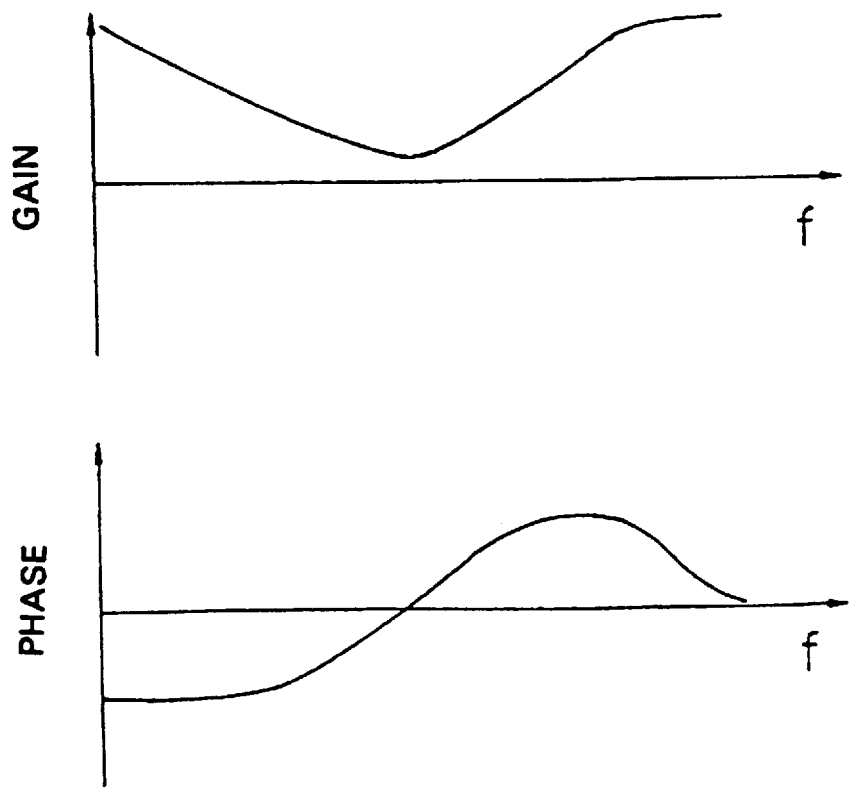
FIG. 12 is a Bode diagram of the power apparatus shown in FIG. 10.

FIG. 4 is a circuit diagram of a second embodiment of a power apparatus of the present invention. The components in FIG. 4 are the same as those of the known art in FIG. 10 except for a controller 100 and therefore, a description thereof is omitted.

Referring to FIG. 4, a controller 100 comprises a first resistor R1 to an eighth resistor R8, a first capacitor C1 and a second capacitor C2. A connection point A of the first resistor R1 and the second resistor R2 which are connected in series between the positive polarity side of a load 5 and a reference electrical potential, e.g., ground potential, is connected to one of the input terminals of an amplifier 11, i.e., the inversion input terminal. An output voltage Vo is thus applied to the inversion input terminal via the first resistor R1. Further, a series circuit formed of the first capacitor C1 and the third resistor R3 is connected between the inversion input terminal and the output terminal of the amplifier 11, and further, a fourth resistor R4 is connected in parallel to the series circuit.

On the other hand, a connection point B of the fifth resistor R5 and a parallel circuit formed of the second capacitor C2 and the sixth resistor R6 is connected via the seventh resistor R7 to the other input terminal, i.e., the non-inversion input terminal of the amplifier 11, and the command voltage Vr is applied via the eighth resistor R8. The resistors R5 and R6 are connected in series between the positive polarity side of the load 5 and the ground potential. Thus, the output voltage Vo is applied to the non-inversion input terminal via the fifth resistor R5 and the seventh resistor R7, and the command voltage Vr is applied to the non-inversion input terminal via the eighth resistor R8.

Further, the output terminal of the amplifier 11 is connected to the comparison input terminal 21a of the comparator 21 inside the power converter 2.

Figure 6:
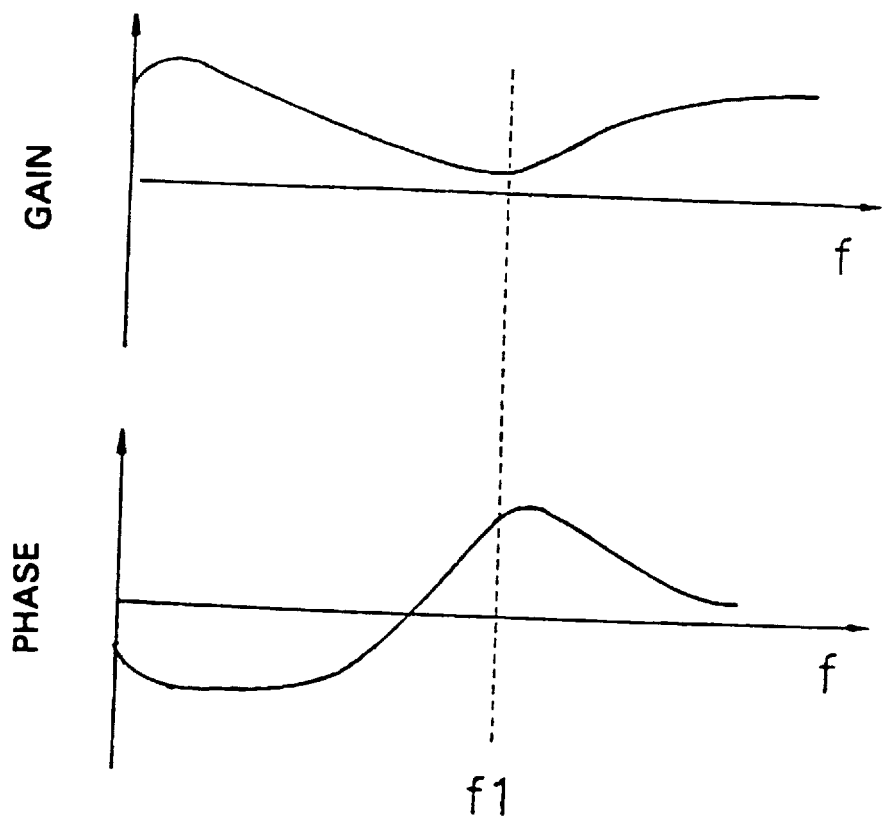
FIG. 6 is a Bode diagram of the power apparatus shown in FIG. 4.

Here, determination of the relationship between the output voltage Vo of the power apparatus of this embodiment shown in FIG. 4 and the control signal u gives the following:

$$\frac{\beta 2 s^2 + \beta 1 s + \beta 0}{(s + \alpha 0)(s + \alpha 1)} \tag{7}$$

as a computational element with respect to the difference obtained by subtracting the output voltage Vo from the function of the command voltage Vr and supplies the output thereof to the power converter 2. FIG. 6 is a Bode diagram of the controller 100 shown in FIG. 4.

In the second embodiment as described above, in addition to the advantages of the first embodiment, the controller 100 is arranged as shown in FIG. 4, and the transmission function thereof is made to take the form shown in equation (7). Therefore, as shown in FIG. 6, a function of decreasing gain while the phase is made to lead at a particular frequency f1 can be realized, and the gradient of the gain can be suppressed in the low frequency range by action of the fourth resistor R4. As a result, a design for a more stable control system having a satisfactory response can be made, and when the load decreases suddenly, it becomes possible to quickly discharge the charge in the first capacitor C1 through the fourth resistor R4.

The above-described embodiments include a portion which is a step-up type energy conversion circuit portion formed of a power MOSFET 24, a choke coil 25, and a smoothing circuit 4. However, advantages similar to those of the above-described embodiments can be obtained by using other types of energy conversion circuits.

Figure 7:
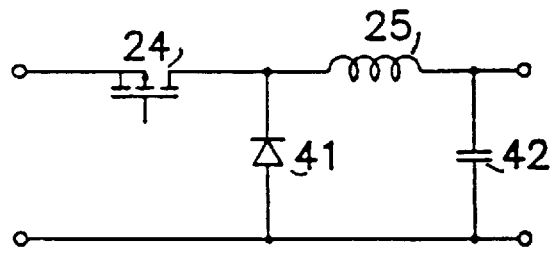
FIG. 7 is a circuit diagram of a modification of the power apparatus of the present invention.

Examples thereof include a step-down type, as shown in FIG. 7, in which the drain of the power MOSFET 24 and the $$u = \frac{\beta 2 s^2 + \beta 1 s + \beta 0}{(s + \alpha 0)(s + \alpha 1)} \left\{ \left( k' + \frac{s(\gamma 1 s + \gamma 0)}{\beta 2 s^2 + \beta 1 s + \beta 0} \right) Vr - Vo \right\} \tag{6}$$

where $$\alpha 0 = \frac{1}{C2} \left( \frac{1}{R5} + \frac{1}{R6} + \frac{1}{R7 + R8} \right)$$

$$\alpha 1 = \frac{1}{C2(R3 + R4)}$$

$$\beta 0 = \frac{R4}{R3 + R4} \left\{ \frac{1}{C1C2R1} \left( \frac{1}{R5} + \frac{1}{R6} + \frac{1}{R7 + R8} \right) - \frac{R8}{C1C2C5(R7 + R8)} \left( \frac{1}{R1} + \frac{1}{R2} + \frac{1}{R4} \right) \right\}$$

$$\beta 1 = \frac{R4}{R3 + R4} \left\{ \frac{1}{C1R1} + \frac{R3}{C2R1} \left( \frac{1}{R5} + \frac{1}{R6} + \frac{1}{R7 + R8} \right) \right\} - \frac{R8}{C2R5(R7 + R8)} \left\{ \left( \frac{1}{R1} + \frac{1}{R2} + \frac{1}{R4} \right) R3 + 1 \right\}$$

$$\beta 2 = \frac{R3 R4}{R1(R3 + R4)}$$

$$k' = \frac{\left( \frac{1}{R1} + \frac{1}{R2} + \frac{1}{R4} \right) \left\{ \left( \frac{1}{R5} + \frac{1}{R6} \right) \frac{R7}{R7 + R8} + \frac{1}{R7 + R8} \right\}}{\left( \frac{1}{R5} + \frac{1}{R6} + \frac{1}{R7 + R8} \right) \frac{1}{R1} - \left( \frac{1}{R1} + \frac{1}{R2} + \frac{1}{R4} \right) \frac{R8}{R5(R7 + R8)}}$$

$$\gamma 0 = \frac{R4}{R3 + R4} \left\{ \frac{R7}{C1(R7 + R8)} \left( \frac{1}{R1} + \frac{1}{R2} + \frac{1}{R4} \right) + \frac{R3}{C2(R7 + R8)} \left( \frac{1}{R1} + \frac{1}{R2} \right) \left( 1 + \left( \frac{1}{R5} + \frac{1}{R6} \right) R7 \right) \right\} +$$

$$\frac{1}{C2(R7 + R8)} \left\{ 1 + \left( \frac{1}{R5} + \frac{1}{R6} \right) R7 \right\} - \beta 1 k'$$

$$\gamma 1 = \frac{R4 R7}{(R3 + R4)(R7 + R8)} \left\{ \left( \frac{1}{R1} + \frac{1}{R2} + \frac{1}{R4} \right) R3 + 1 \right\} - \beta 2 k'$$

Figure 5:
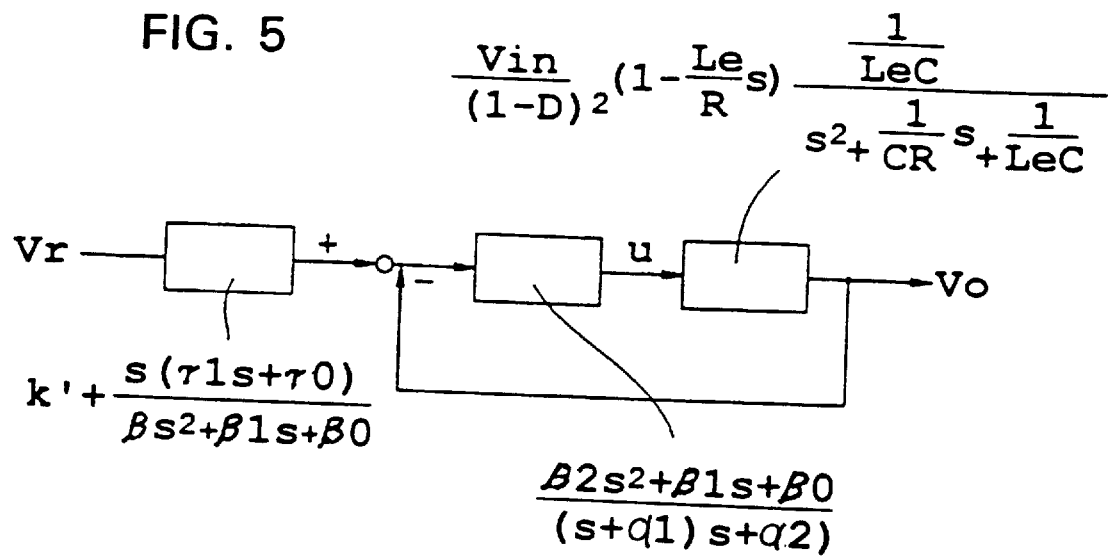
FIG. 5 is a block diagram of the power apparatus shown in FIG. 4.

FIG. 5 is a block diagram of the power apparatus shown in FIG. 4. In FIG. 5, the controller 100 uses cathode of a rectification diode 41 are connected to the positive polarity side of the load 5 via a choke coil 25, the source of the power MOSFET 24 is connected to the positive polarity side of the power source 3, and the anode of the rectification diode 41 is connected to the negative polarity side of the power source 3 and the negative polarity side of the load 5.

Figure 8:
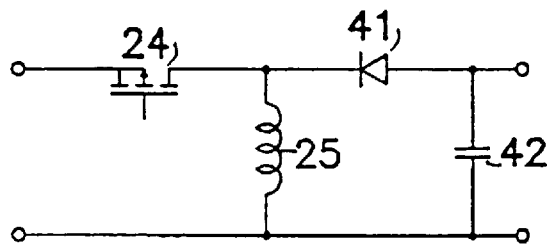
FIG. 8 is a circuit diagram of another modification of the power apparatus of the present invention.

An inversion type is shown in FIG. 8, in which the drain of the power MOSFET 24 and one end of the choke coil 25 are connected to the cathode of the rectification diode 41, the anode of the rectification diode 41 is connected to the negative polarity side of the load 5, the source of the power MOSFET 24 is connected to the positive polarity side of the power source 3, and the other end of the choke coil 25 is connected to the negative polarity side of the power source 3.

Figure 9:
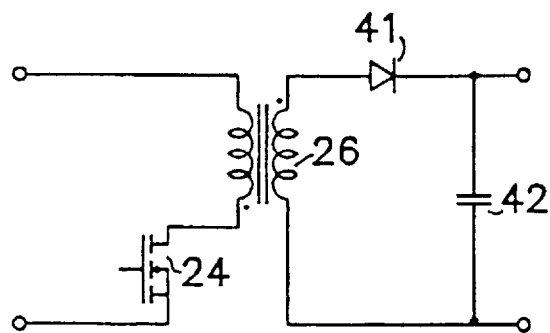
FIG. 9 is a circuit diagram of still another modification of the power apparatus of the present invention.

In a step-up/down type, as shown in FIG. 9, the drain of the power MOSFET 24 is connected to the positive polarity side of the power source 3 via the primary coil of a transformer 26, the source of the power MOSFET 24 is connected to the negative polarity side of the power source 3, one end of the secondary coil of the transformer 26 is connected to the anode of the rectification diode 41, the cathode of the rectification diode 41 is connected to the positive polarity side of the load 5, and the other end of the secondary coil of the transformer 26 is connected to the negative polarity side of the load 5.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A power apparatus, comprising:
a power converter for controlling a voltage from a power source, and supplying an output to a load;
a smoothing circuit which receives the power converter output and supplies a smoothed output to said load; and
a controller for controlling said power converter, said controller receiving a command voltage and an output voltage at said load as inputs, using $$\frac{b2s^2 + b1s + b0}{s(s + a0)}$$

as a computational element with respect to the difference obtained by subtracting said output voltage from a function of said command voltage and supplying an output of said controller to said power converter,
wherein said controller comprises an amplifier, a connection point of a first and a second resistor which are connected in series between a positive polarity side of said load and a reference electrical potential is connected to one of the input terminals of the amplifier, a series circuit formed of a first capacitor and a third resistor is connected between said one of the input terminals of said amplifier and an output terminal of said amplifier, the connection point of a fourth resistor and a parallel circuit formed of a fifth resistor and a second capacitor, which are connected in series between a positive polarity side of said load and the reference electrical potential is connected via a sixth resistor to another input terminal of said amplifier, and said command voltage is applied via a seventh resistor to said other input terminal of said amplifier;

wherein the first and second capacitors have capacitances C1 and C2, respectively;
wherein the first through seventh resistors have resistances R1–R7, respectively;
wherein s is a complex variable; and
wherein $$a = \frac{1}{C2}\left(\frac{1}{R4} + \frac{1}{R5} + \frac{1}{R6+R7}\right)$$

$$b0 = \frac{1}{C1C2R1}\left(\frac{1}{R4} + \frac{1}{R5} + \frac{1}{R6+R7}\right) - \frac{R7}{C1C2R4(R6+R7)}\left(\frac{1}{R1} + \frac{1}{R2}\right)$$

$$b1 = \frac{1}{C1R1} + \frac{R3}{C2R1}\left(\frac{1}{R4} + \frac{1}{R5} + \frac{1}{R6+R7}\right) - \frac{R7}{C2R4(R6+R7)}\left\{\left(\frac{1}{R1} + \frac{1}{R2}\right)R3 + 1\right\}$$

and $$b2 = \frac{R3}{R1}.$$

2. A power apparatus, comprising:
a power converter for controlling a voltage from a power source, and supplying an output to a load;
a smoothing circuit which receives the power converter output and supplies a smoothed output to said load; and
a controller for controlling said power converter, said controller receiving a command voltage and an output voltage at said load as inputs, using $$\frac{\beta 2s^2 + \beta 1s + \beta 0}{(s + \alpha 0)(s + \alpha 1)}$$

as a computational element with respect to the difference obtained by subtracting said output voltage from a function of said command voltage and supplying an output of said controller to said power converter,
wherein said controller comprises an amplifier, a connection point of a first and a second resistor which are connected in series between a positive polarity side of said load and a reference electrical potential is connected to one of the input terminals of the amplifier, a series circuit formed of a first capacitor and a third resistor is connected between said one of the input terminals of said amplifier and an output terminal of said amplifier, a fourth resistor further being connected in parallel with said last-mentioned series circuit between said one of the input terminals of said amplifier and said output terminal thereof, the connection point of a fourth resistor and a parallel circuit formed of a fifth resistor and a second capacitor, which are connected in series between a positive polarity side of said load and the reference electrical potential is connected via a seventh resistor to another input terminal of said amplifier, and said command voltage is connected via an eighth resistor to said other input terminal of said amplifier,
wherein the first and second capacitors have capacitances C1 and C2, respectively;
wherein the first through eighth resistors have resistances R1–R8, respectively;

wherein s is a complex variable; and
wherein $$\alpha 0 = \frac{1}{C2}\left(\frac{1}{R5} + \frac{1}{R6} + \frac{1}{R7+R8}\right)$$

$$\alpha 1 = \frac{1}{C2(R3+R4)}$$

$$\beta 0 = \frac{R4}{R3+R4}\left\{\frac{1}{C1C2R1}\left(\frac{1}{R5}+\frac{1}{R6}+\frac{1}{R7+R8}\right) - \frac{R8}{C1C2C5(R7+R8)}\left(\frac{1}{R1}+\frac{1}{R2}+\frac{1}{R4}\right)\right\}$$

$$\beta 1 = \frac{R4}{R3+R4}\left\{\frac{1}{C1R1} + \frac{R3}{C2R1}\left(\frac{1}{R5}+\frac{1}{R6}+\frac{1}{R7+R8}\right)\right\} - \frac{R8}{C2R5(R7+R8)}\left\{\left(\frac{1}{R1}+\frac{1}{R2}+\frac{1}{R4}\right)R3 + 1\right\}$$

and $$\beta 2 = \frac{R3R4}{R1(R3+R4)}.$$

* * * * *